(12) United States Patent
Ruegenberg (10) Patent No.: US 6,230,522 B1
(45) Date of Patent: May 15, 2001

(54) METHOD FOR SETTING WELDING PARAMETERS FOR BUTT END JOINING OPTICAL FIBERS BASED ON AN OFFSET

(75) Inventor: Gervin Ruegenberg, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/955,405

(22) Filed: Oct. 21, 1997

(30) Foreign Application Priority Data

Oct. 24, 1996 (DE) ............................................. 196 44 304

(51) Int. Cl.$^7$ ................................................... C03B 37/07
(52) U.S. Cl. .................................. 65/377; 65/378; 65/407
(58) Field of Search ............................... 65/407, 377, 378

(56) References Cited

U.S. PATENT DOCUMENTS

| | | | |
|---|---|---|---|
| 3,819,249 | * 6/1974 | Borner | 65/407 |
| 4,557,556 | * 12/1985 | Decker | 65/407 |
| 4,557,557 | * 12/1985 | Gleason | 65/407 |
| 4,948,412 | 8/1990 | Yamada et al. . | |
| 5,011,259 | 4/1991 | Lieber et al. . | |
| 5,013,345 | * 5/1991 | Itoh . | |
| 5,046,812 | * 9/1991 | Yanagi | 65/407 |
| 5,078,489 | 1/1992 | Lieber . | |
| 5,249,247 | * 9/1993 | Whitesmith . | |
| 5,648,007 | * 7/1997 | Reslinger | 65/407 |

FOREIGN PATENT DOCUMENTS

| | | | |
|---|---|---|---|
| 321947 | * 6/1989 | (EP) | 65/407 |
| 0 504 519 | 9/1992 | (EP) . | |

OTHER PUBLICATIONS

IEEE, Aug. 1978, Hatakeyama et al. "Fusion Splices for Single–Mode Optical Fibers" pp. 614–619.*

ECL Tech. Journ. (1979) Hatakeama et al, Fusion Splices for Single–Mode Optical Fibers pp. 981–997.*

* cited by examiner

*Primary Examiner*—John Hoffmann
(74) *Attorney, Agent, or Firm*—Schiff Hardin & Waite

(57) ABSTRACT

Two contacting test fibers that are radially offset relative to one another with a prescribable initial offset are heated such that an offset-reducing effect occurs. The resultant reduction of the initial offset is utilized for setting, particularly optimizing welding parameters.

2 Claims, 6 Drawing Sheets

METHOD FOR SETTING WELDING PARAMETERS FOR BUTT END JOINING OPTICAL FIBERS BASED ON AN OFFSET

In practice, the optimum setting of welding or, respectively, splicing parameters, which include for example, pre-welding current or, respectively, temperature, pre-welding duration, longitudinal spacing of the fiber ends during the pre-welding, fiber feed, main welding current intensity, main welding duration, electrode spacing, etc., can be made difficult for the faultless thermal welding, particularly fusion welding of light waveguides. Additionally, the mutual dependencies or, respectively, inter-dependencies of the parameters on one another are thereby unfavorable for the setting.

The fusion welding method of U.S. Pat. No. 4,948,412 attempts to keep the influence of concentricity errors of the cores of two optical fibers to be welded to one another on the splice attenuation of their finished welded connection as low as possible. To that end, the two optical fibers are first aligned in alignment with one another with respect to their eccentric fiber cores and the lateral misalignment, i.e. offset, between their central axes that results therefrom is then measured, for example with the assistance of a microscope. For the subsequent fusing of the glass material of the two optical fibers, the welding time, the welding current or the welding energy are determined according to an inverse relationship to this measured, original, i.e. initial offset. One thus prevents the self-centering of the fibers relative to one another from becoming too great due to the surface tension of the molten glass material of the fibers and prevents the fiber cores previously aligned in alignment with one another from being inadmissibly offset relative to one another or, respectively, bent. Such a determination is thereby implemented for the production of every individual fiber splice and this makes the method very involved. A further disadvantage of this known method is that the fiber core eccentricity by itself does not represent the critical quantity for achieving an optimum welding process, i.e. this method only incorporates the possible quantities that define a quality of the welded connection to an inadequate extent.

EP-A1 0 504 519 discloses a light waveguide welding means wherein a pressure sensor is provided that generates a control signal dependent on the measured atmospheric air pressure. The respectively applied discharge current is set to a predetermined value on the basis of the air pressure measured in this way. In addition to the not inconsiderable outlay for the pressure cell as well as for the control quantity to be derived therefrom, this method likewise has the particular disadvantage that the air pressure by itself does not represent the critical quantity for achieving an optimum welding process.

WO 95/24664 discloses a method for welding the ends of optical fibers wherein the manipulated variables for the arc are selected such that the electrical power is kept constant during the welding process itself. To this end, a voltage is generated that is proportional to the respectively momentary power, and this voltage is forwarded to a control means that varies an electrical actuator such that the power is respectively kept essentially constant during the welding process (specifically, during the arc drop voltage). This method likewise incorporates the possible quantities that determine a quality of the welded connection to an inadequate extent.

SUMMARY OF THE INVENTION

The invention is based on the object of disclosing a way of how welding parameters for the thermal welding of waveguide fibers or, respectively, optical fibers can be set better under a number of practical conditions.

This object is inventively achieved in the following way:

Method for setting welding parameters for the production of a thermal weld between two respective optical fibers, comprises the steps of positioning at least two optical test fibers relative to one another with a prescribable, radial initial offset, contacting the end faces of these test fibers, which are arranged radially offset relative to one another, with one another, heating the region around the contacting point of the test fibers so that in at least one welding process an offset-reducing effect between the two test fibers occurs, and utilizing the resultant reduction of the initial offset for setting at least one welding parameter.

This makes it possible to simply as well as reliably adapt at least one of the welding parameters such as, for example, intensity of welding current, welding duration, etc., which parameters are critical for the respective welding process, to the welding conditions respectively currently present (such as, for example, air pressure, air humidity, air temperature, type of optical fiber employed, electrode condition, etc., under a number of practical conditions. Possible quantities determining a quality of the weld can thus be comprehensively co-involved. Changing or, respectively, different welding conditions can thus be taken into account, i.e. the setting of welding parameters can thus be undertaken in a simple way such that an optimally good weld between two respective optical fibers that is largely independent of environmental and/or ambient influences can be produced. The splice quality of thermal welds between at least two optical fibers can be quite substantially improved in this way.

The invention is also directed to a method for the welding of respectively two optical fibers allocated to one another, whereby at least one test splice for determining an optimum set of welding parameters is first produced in at least one pre-trial for the respectively currently existing welding conditions. The method comprises testing by arranging two test fibers offset relative to one; another with a prescribable, lateral initial offset with respect to their long sides, by bringings these test fibers arranged laterally offset relative to one another into contact with one another at their end faces, by heating the contacting region of these two test fibers so that, due to the surface tension of their melted glass material, the predetermined lateral initial offset is reduced, and by identifying at least one criterion for this offset reduction;

determining the optimum set of welding parameters on the basis of the at least one criterion and setting the welding parameter in fixed fashion for the existing welding conditions;

and only after this at least one pre-trial then producing the actual weld between two respective optical fibers with the optimum welding parameters determined therefrom.

The invention is also directed to an apparatus for setting welding parameters for producing a thermal weld between at least two optical fibers, which apparatus includes, positioning means with which at least two test fibers can be positioned with a prescribable radial initial offset relative to one another are provided, a heating device is provided that heats the region around the contacting location of the test fibers such that an offset-reducing effect can be effected thereat, and an evaluation/control means is provided that acquires the effected reduction of the initial offset and utilizes it for setting at least one welding parameter.

Other advantages and features of the invention will be readily apparent from the following description of the preferred embodiments, the drawings and claims.

BRIEF DESCRIPTION OF THE DRAWINGS

FIGS. 6–8 are various residual offset/time diagrams that derive in various versions of the inventive method with FIG. 6 illustrating offset versus time for continuous welding.

DESCRIPTION OF THE PREFERRED EMBODIMENTS

Elements having the same function and action are respectively provided with the same reference characters in FIGS. 1 through 9.

Figure 1:
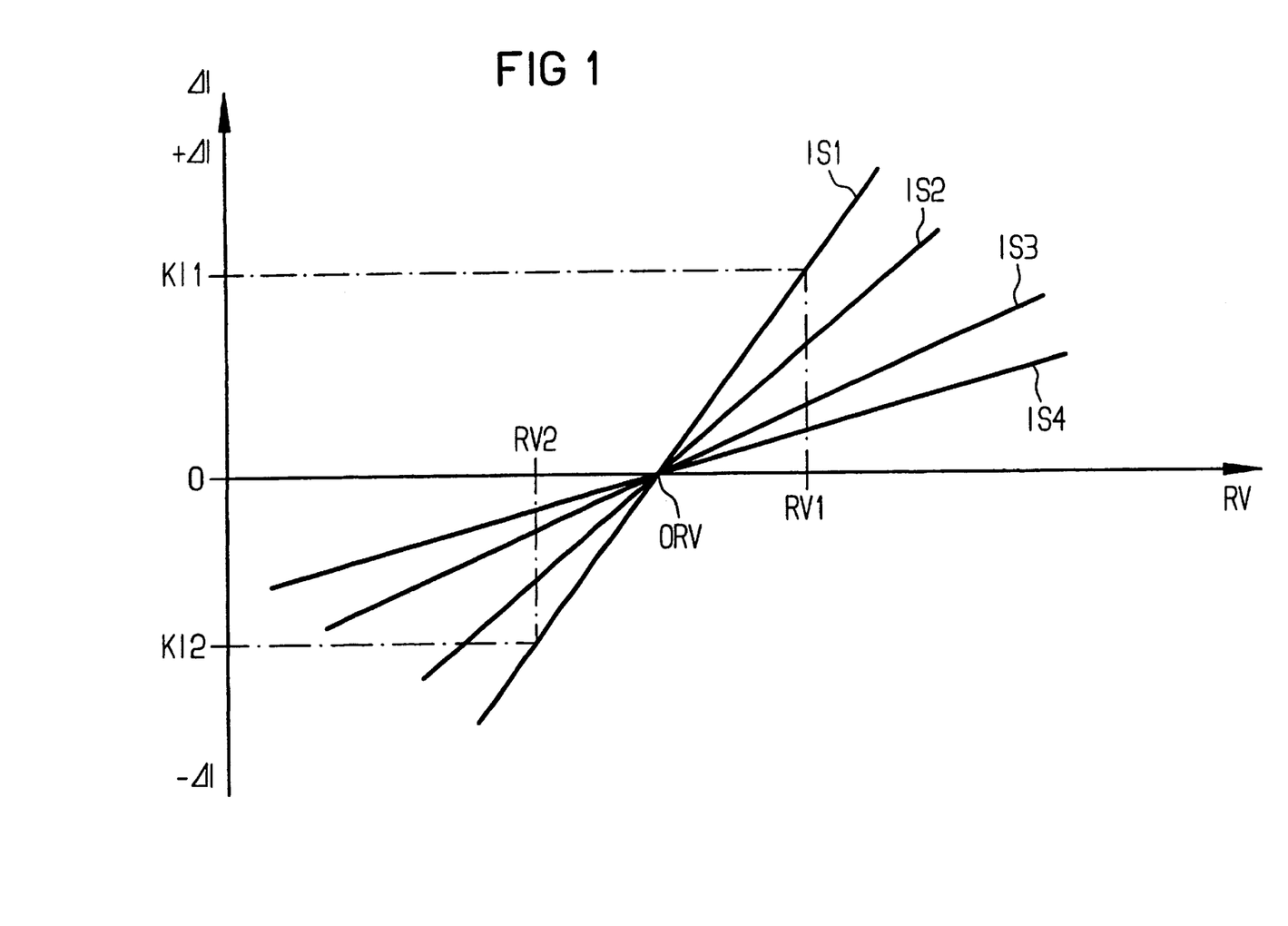
FIG. 1 is a graph schematiclly showing a possible field of characteristics relating to the inventive adaptation or, respectively, correction of one of the welding parameters.
Figure 2:
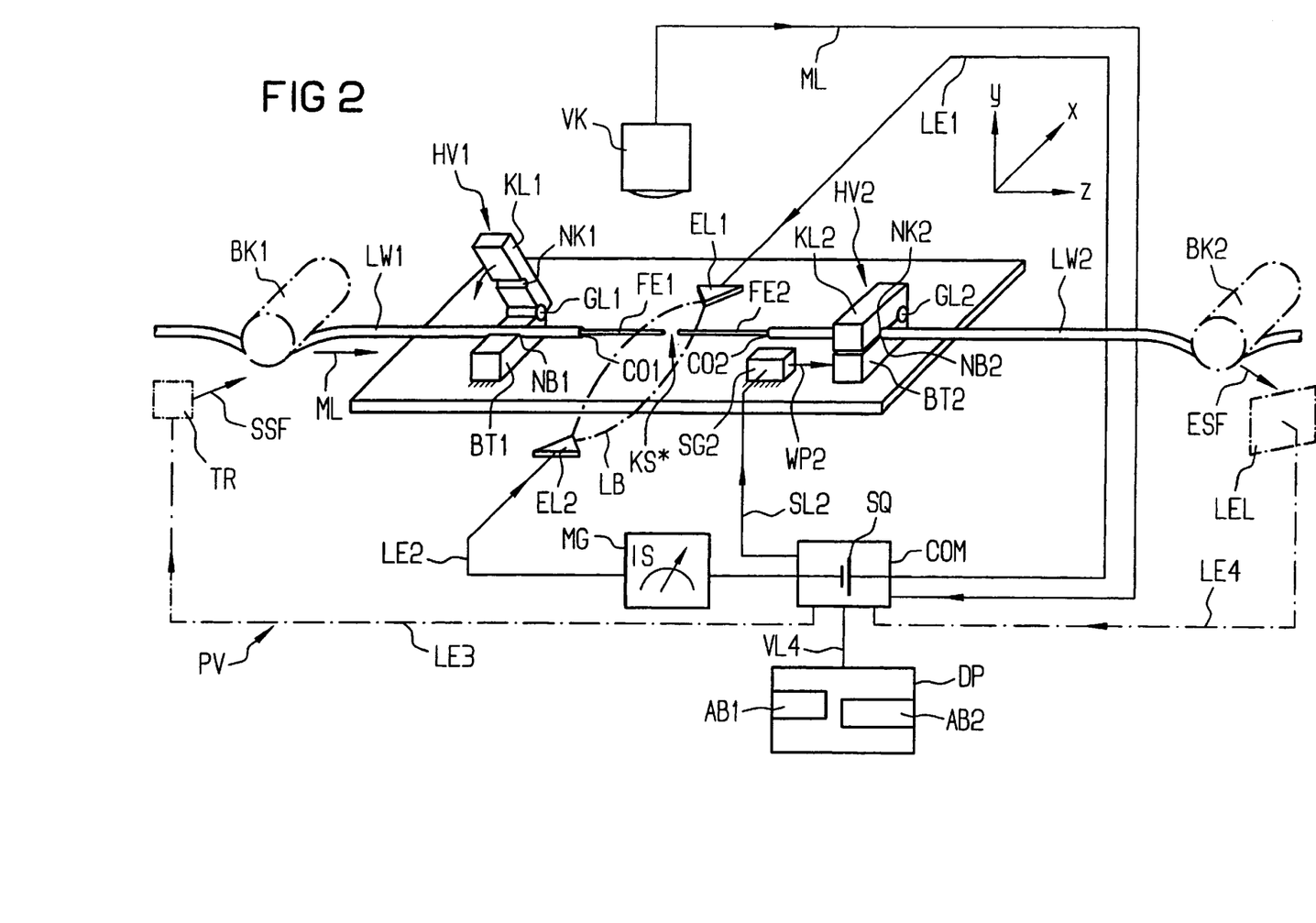
FIG. 2 is a partial schematic perspective view of the basic structure of an apparatus for the implementation of the inventive method.

Schematically and by way of example, FIG. 1 shows a possible field of characteristics relating to the inventive adaptation of the electrical welding current of a welding/measuring device to different environmental and/or ambient influences in order to always be able to enable a faultless, particularly optimized, thermal welding of respectively two optical fibers, even given changing welding conditions. The basic structure of a welding/measuring device suitable therefor is shown in FIG. 2, partly in perspective. The welding apparatus is referenced PV therein. Advantageously, it is fashioned such that optimum welding or, respectively, splicing parameters for the thermal welding of at least two light waveguides can be identified and set with its assistance under specifically given, i.e. specifically existing welding or, respectively, splicing conditions (such as, for example, air humidity, air pressure, air temperature, fiber type, electrode condition, etc.). The welding apparatus PV is thereby preferably a component part of a light waveguide splicing device, particularly a light waveguide fusion welding device.

Two light waveguides LW1, LW2 are first placed into the welding apparatus PV of FIG. 2. Preferably as test light waveguides, these serve the purpose of acquiring an optimum set of welding parameters for the respective, i.e. currently existing welding conditions in at least one pre-trial. What is thereby understood by the expression "optimum set of welding parameters" in the framework of the invention is that set of welding parameters for the implementation of at least one welding process at which a weld having minimal transmission attenuation can be produced between two respective optical fibers under the respective, i.e. currently existing welding conditions. In, for example, arc welding with glow discharges, at least one of the following welding parameters can, in particular, be optimized by corresponding variation: pre-welding current or, respectively, temperature, pre-welding duration, longitudinal spacing of the fiber ends during the pre-welding, fiber feed, intensity of the main welding current, duration of the main welding and/or electrode spacing, etc. This at least one pre-trial thus preferably serves the purpose of producing an adaptation, particularly an optimization of one or more welding parameters to new welding conditions that may be potentially present. The actual production of fiber splice connections, i.e. the actual welding of two respective optical fibers to be connected to one another, is begun only thereafter, i.e. according to a correspondingly corrected set of welding parameters. Expediently, the optical fibers to be actually welded to one another later are thereby themselves employed as test fibers for determining an optimum set of welding parameters. As warranted, separate optical fibers, whose type, particularly glass viscosity, preferably corresponds insofar as possible to the fibers to be welded to one another later, can also be employed as test fibers.

The two test light waveguides LW1, LW2 are held and positionally fixed in allocated holding devices HV1 or, respectively, HV2 of a known type (such as, for example, manipulators) of the welding apparatus PV. For better illustration of the fixing effect of the first holding device HV1, this is shown in its opened condition, by way of example, in the left half of FIG. 2. It comprises a base part BT1 at whose upper surface is provided with a longitudinal channel NB1. The first, coated or plastic-coated test light waveguide LW1 is placed into this longitudinal channel NB1. A flap KL1 that is pivotable in the direction toward the base part BT1 is attached to the base part BT1 via an articulation GL1, which may be a hinge or the like. A longitudinal channel NK1 corresponding to the longitudinal channel NB1 in the base part BT1 is provided at the inside surface of the flap or, respectively, cover KL1. After closing the holding device HV1, thus, the first test light waveguide LW1 is clamped between the base part BT1 and the cover or, respectively, upper part KL1 and is held fast thereat. Analogously thereto, the second holding device HV2 fixes the second, coated test light waveguide LW2. FIG. 2 thereby shows the holding device HV2 in its closed condition in the right half of the Figure. The second, coated test light waveguide LW2 is clamped between its base part BT2 and cover KL2 and thereby held fast. The cover KL2 is thereby pivotably attached to the base part BT2 with the assistance of an articulation GL2. For the attitudinal positioning of the second test light waveguide LW2, a longitudinal channel NB2 is formed in the inside or upper surface—of the base part BT2 and, corresponding thereto, a longitudinal channel NK2 formed in the inside or underside surface—of the cover KL2.

Each test light waveguide LW1, LW2 has a prescribable end length projecting freely from its appertaining holding device HV1, HV2. The plastic coating, which may be the primary and/or secondary coating C01 or, respectively, C02 of the respective test light waveguide LW1 or, respectively, LW2 is thereby removed along a prescribable end section, so that the light-guiding fiber or, respectively, optical fiber of the respective light waveguide LW1 or, respectively, LW2 is respectively exposed on stripped thereat along a prescribable end length. A first optical test fiber or, respectively, test optical fiber FE1 as well as a second optical test fiber FE2 thus reside opposite one another. In particular, the first as well as the second test light waveguide LW1, LW2 are initially positioned such relative to one another so that their face ends reside opposite one another at a prescribable longitudinal spacing LA (see FIG. 3). The respective test light waveguide LW1 or, respectively, LW2 thereby preferably extends essentially along a straight line.

The two holding devices HV1, HV2 are arranged on a common base plate GP. At least one of the two holding devices HV1 or, HV2, which in the present example it is HV2, is fashioned; transversely displaceable in at least one spatial direction, particularly perpendicular to the respective longitudinal fiber axis. It is assumed in the present example, that the second holder mechanism HV2 allows movement in all three spatial directions, namely x, y, z of a Cartesian coordinate system. The spatial direction z thereby prescribes a longitudinal direction parallel whereto each of the two test fibers FE1, FE2 can be aligned. The two test fibers FE1, FE2 can be moved toward or away from one another along the z-direction. In particular, the z-direction corresponds to a desired alignment line along which the fibers to be actually welded to one another later—after implementation of the pre-trial—are to be optimally aligned with one another with respect to their outside contours and/or fiber cores. The spatial direction x proceeds in a transverse direction to the longitudinal extent of the two light waveguides LW1, LW2, particularly perpendicularly, i.e. orthogonally to the spatial direction z. The planar base plate GP thereby lies, in particular, parallel to the plane erected by the x as well as z spatial direction. The spatial direction y resides perpendicular to this x,z-plane, i.e. it proceeds upward or downward. The displacement of the second holding device HV2 into the corresponding spatial direction x, y or z is undertaken with the assistance of an actuator SG2 that receives its control signals from an evaluation/control means COM via a control line SL2. The displacement effect of the actuator SG2 on the allocated holding device HV2 is schematically indicated in FIG. 2 with the assistance of an action arrow WP2.

In order to be able to acquire the respective, current positional offset of the two test optical fibers FE1, FE2 transversely, particularly orthogonally relative to their longitudinal extent, i.e. their momentary, lateral alignment condition relative to one another, an optical imaging system or, respectively, image processing system VK, particularly a video camera, is allocated in FIG. 2 to the region KS* of the fiber ends FE1, FE2 residing opposite one another In particular, an image processing system as recited in detail in U.S. Pat. No. 5,011,259 in terms of functioning and action is suitable therefor. The optical fiber ends are transilluminated with light therein, whereby they respectively act like cylinder lenses for the light passing through them. For the sake of graphic simplicity, the optical imaging or, respectively, pick-up system VK is only schematically indicated above the base plate GP in FIG. 2. The optical imaging system VK is connected via a test line ML to the evaluation/control means COM in order to be able to interpret the image information it picks up. With the assistance of the optical imaging system VK, it is thus possible to acquire a respective optical image or, respectively, projection image in at least one plane of observation for the respective optical fiber, the test fibers FE1 or, respectively, FE2 here, and to offer the image information thereof for evaluation. The optical imaging and pick-up system VK is arranged in FIG. 2 with respect to the test fibers FE1, FE2 so that their projection images can, for example, be registered in the x,z attitudinal plane. Analogously thereto, a potential lateral offset of the two test fibers FE1, FE2 relative to one another can also be potentially acquired in other planes of observation such as, for example, in the y,z-plane of FIG. 2 that lies perpendicular to the x, z observation plane.

In this way, a potential offset of the test fibers relative to one another can be multi-dimensionally acquired, i.e. in a plurality of different observation planes. In particular, the spatial, overall radial offset of the two fiber ends relative to one another can be determined in that their relative topical position relative to one another is determined in at least two observation planes.

Given the welding apparatus PV of FIG. 2, the relative position of the two fiber images relative to one another in the respective observation plane is visualized with the assistance of a display means, particularly a display DP. To that end, the display means DP is connected via a data line VL4 to the evaluation/control means COM. The display DP schematically shows the images AB1, AB2 of the two test fiber ends FE1, FE2, for example, in the x, z observation plane as a rectangular stripe, namely with a lateral offset of their outside contours in the x-direction.

Of course, it can also be expedient to acquire the current aligned condition of the two test optical fiber ends FE1, FE2 with one another with the assistance of other measuring means. The components (such as, for example, BK1, BK2, TR, LEL, LE3, LE4) of such an additional or alternative system for the determination of the radial offset of the two test optical fibers FE1, FE2 relative to one another are co-entered dot-dashed in FIG. 2. It comprises an optical transmitter TR, particularly a laser diode, that is coupled to the first test light waveguide LW1 with the assistance of a flex coupler BK1. When viewed from left to right, the flex coupler BK1 is thereby arranged in front of the holding device HV1. Parts of the transmission radiant field SSF of the optical transmitter TR are coupled into the first test light waveguide LW1 at the transmission side (in the left half of FIG. 2 here) in the direction of its exposed test optical fiber FE1 with the assistance of the flex coupler BK1. The drive of the optical transmitter TR can ensue from the evaluation/control means COM via a control line LE3. In this way, a test light ML runs through the first optical test fiber FE1 and is coupled over into the test optical fiber FE2 residing opposite it. After running through the test optical fiber FE2, parts of this test light ML can therefore be coupled out at the reception side with the assistance of a second flex coupler BK2 that is arranged following the second holding device HV2 in the right half of FIG. 2. In FIG. 2, the reception radiant field ESF of these test light parts coupled out at the reception side is acquired with the assistance of at least one light-sensitive element LEL, particularly a photodiode, and is forwarded via a test line LE4 to the evaluation/control means COM for evaluation. In this way, it is possible to identify changes in the test light ML sent over the two test optical fibers FE1, FE2 and to utilize these changes as a criterion for a potential radial offset of the two test optical fibers FE1, FE2 relative to one another. In particular, it can thereby be expedient to identify the attenuation of the test light ML transmitted over the two test optical fibers FE1, FE2, i.e. the coupled-over test light ML, with the assistance of the measuring method disclosed by U.S. Pat. No. 5,078,489 (LID method="light injection and detection"). An increase in attenuation in the crossover of the light or, respectively, transmission of the light is caused dependent on the degree of radial offset of the two test optical fibers FE1, FE2 relative to one another. The attenuation also becomes all the greater, the greater the radial offset of the two optical fiber ends FE1, FE2 relative to one another becomes, so that an unambiguous allocation between the temporal pick-up of the attenuation curve and the degree of radial positional offset of the two test optical fibers FE1, FE2 relative to one another is possible.

Figure 3:
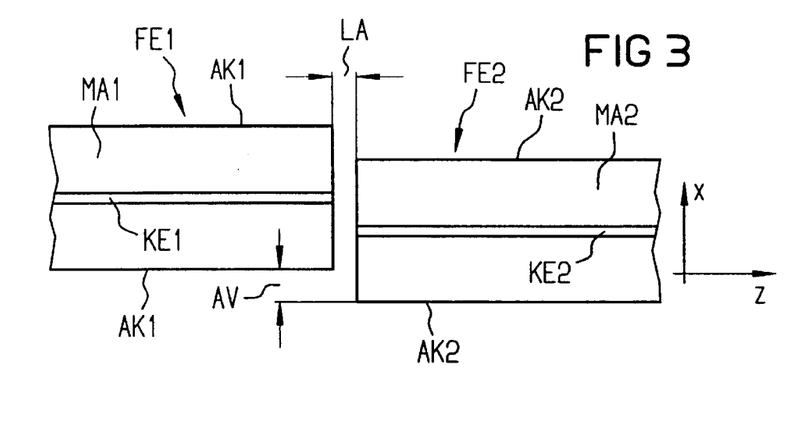
FIG. 3 is a magnified schematic view of a projection plane with the optical imagings of two optical test fibers that are positioned in the apparatus of FIG. 2 with a prescribable, radial initial offset relative to one another.

FIG. 3 shows the two test optical fibers FE1 or, respectively, FE2 in the region of their end faces in a common observation or, respectively, positional plane—such as, for example, the x,z-plane of FIG. 2—schematically as well as magnified in the form of a respective rectangular stripe. For greater clarity, the course of the fiber core (core) KE1 or, respectively, KE2 of the respective test optical fiber FE1 or, respectively, FE2 is additionally entered in FIG. 3. The respective fiber core KE1 or, respectively, KE2 proceeds essentially centrally in the inside of the cladding glass (cladding) MA1 or, respectively, MA2 of the respective test optical fiber FE1 or, respectively, FE2. Considered spatially, this means that the respective test optical fiber FE1 or, respectively, FE2 comprises an essentially circular-cylindrical fiber core KE1 or, respectively, KE2 in its center on which the cladding glass MA1 or, respectively, MA2 is seated as a circular-cylindrical coating.

The end faces of the two test optical fibers FE1 or, respectively, FE2 are first positioned relative to one another in a first step so that they reside opposite one another with a prescribable longitudinal spacing. The two test optical fibers FE1 or, respectively, FE2 thereby extend essentially on a straight line along the z-direction (also see FIG. 2). In a next step, they are then aligned relative to one another so that their outside contours AK1 or, respectively, AK2 are displaced by a prescribable, lateral initial offset AV relative to one another—in the x-direction in the x, z plane of observation here—, i.e. their outside contours AK1, AK2 are moved or, respectively, offset by a prescribable transverse spacing AV in the radial direction relative to one another with reference to their respective longitudinal fiber extent. Expressed in general terms, thus, the two test fibers—for the implementation of the pre-trial—are first mispositioned relative to one another in a defined way in the radial direction (with reference to the respective longitudinal fiber axis) in the at least one common positional plane, so that a specific, initial lateral offset between their outside contours is prescribed. To that end, the evaluation/control means COM of the welding apparatus PV of FIG. 2 instructs the actuator SG2 via the control line SL2 to correspondingly displace the second holding device HV2 (with the second test fiber FE2) in the x-direction relative to the stationary, first holding device HV1 (with the first test fiber FE1). When a defined initial offset in the y, z-plane is also potentially desired between the outside contours of the two test fibers FE1, FE2, then the holding device HV2 with the second test fiber FE2 fixed on it can be correspondingly displaced in the y-direction with the assistance of the actuator SG2.

Expressed in general terms, thus, the two test fibers are displaced transversely, particularly orthogonally relative to their longitudinal extent, relative to one another in at least one observation plane with the assistance of positioning means and are brought into such an initial position that a defined, lateral initial offset between their outside contours derives in this plane of observation.

The initial offset AV is preferably selected at most of such a size that the two test fibers can still be contacted at the end faces when brought together in the longitudinal fiber direction. Preferably, the lateral mispositioning of the two test fibers is undertaken so that the radial initial offset AV is at most equal to about half the outside diameter of the respective test fiber.

The test optical fibers FE1 or, respectively, FE2 mispositioned beforehand in radial direction and arranged at a prescribable longitudinal spacing from one another are subsequently pre-heated (=pre-welding process) to softening temperature in the region of their end faces with the assistance of a heating device, particularly a thermal heat source; in particular, they are merely superficially melted.

To that end, for example, two welding electrodes EL1, EL2 in FIG. 2 are allocated to the interspace between the two holding devices HV1, HV2 so that what is referred to as an arc due to glow discharges can form trans-axially, particularly perpendicularly, to the axial longitudinal extent of the two test optical fibers FE1, FE2. For the sake of graphic clarity in FIG. 2, the course of the region in which an arc can respectively propagate between the two electrodes EL1, EL2 (=heating or, respectively, welding zone) is merely indicated in the form of an elongated, dot-dash ellipse and is referenced LB. Whereas the electrode EL1 is allocated to the one long side of the two optical fibers FE1, FE2, the electrode EL2 is located at that lone side of the optical fibers FE1, FE2 lying opposite the welding electrode EL1. In particular, the first welding electrode EL1 lies opposite the second welding electrode EL2 offset by about 180°. The respective welding electrode EL1 or, respectively, EL2 is connected via an appertaining power lead LE1 or, respectively, LE2 to a voltage source SQ that is preferably a component part of the evaluation/control means COM. For the sake of simplicity in the drawing, the voltage source SQ is merely symbolically indicated in FIG. 2. A current meter means MG that measures and displays the intensity IS of the discharge current of the glow discharges between the two electrodes EL1, EL2 is inserted into the power lead LE2. The measuring means ME can thereby be preferably integrated into the evaluation/control means COM, so that the measured discharge current intensities of the glow discharges as well as their appertaining discharge durations are offered for evaluation thereat.

While the test fibers FE1, FE2 positioned laterally offset relative to one another are pre-heated and incipiently melted at their end faces in this way and/or after these mispositioned test fibers have been pre-heated and incipiently melted at their end faces in this way, they are moved toward one another in z-direction until they contact at their end faces. Given the welding apparatus PV of FIG. 2, the second holding device HV2 is displaced to that end in the z-direction toward the stationarily attached, first holding device HV1 with the assistance of the actuator SG2 until the two fiber ends preferably melted in the form of a thin surface film initially come into contact with one another. The corresponding actuation of the actuator SG2 thereby ensues with the evaluation/control means COM via the control line SL2.

Figure 4:
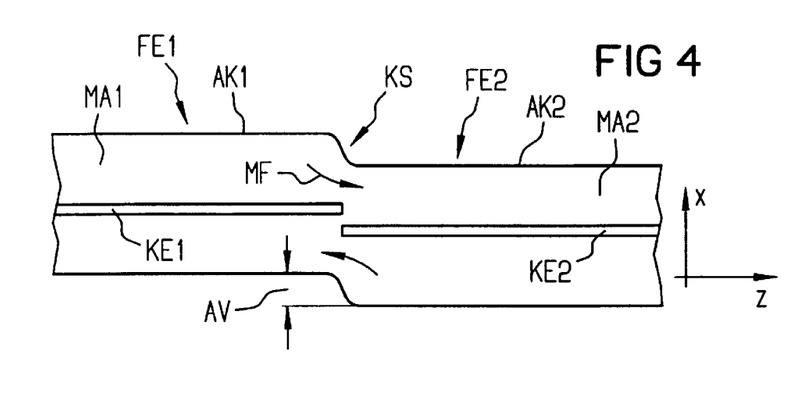
FIG. 4 is a magnified schematic view of the two test fibers of FIG. 3 after their end faces have been melted and contacted with one another.

In a schematic as well as enlarged view, FIG. 4—mating with the observation plane of FIG. 3, likewise in the x, z-plane of observation—shows the region around the contacting location KS of the two test fibers FE1, FE2 intentionally mispositioned in radial direction immediately after their end faces have been brought together (="offset splice"). A fusing of the glass material that has been softened and rendered viscous at the contacting location KS arises only at the end faces of the two test optical fibers FE1, FE2. In this way, the two test fibers FE1, FE2 adhere at their end faces, whereby the predetermined, radial initial offset AV is present at first between their outside contours AK1, AK2. Preferably, the two test optical fibers FE1, FE2 are moved into one another with a slight excess fiber length during this melt gluing. In this way, an "offset splice" with defined, radial initial offset of its test optical fibers is formed without initially considering the tensile strength of the melt gluing.

The glass material in the region of the contacting location KS of the two fiber ends FE1, FE2 melt-glued to one another at their end faces is then subsequently thoroughly heated, particularly melted to the respective fiber center (=main welding) so that a smoothing of the discontinuous, step-shaped initial offset AV between the outside contours of the two test optical fibers FE1, FE2 occurs due to the surface tension of the melted glass material. A rounding effect thus begins thereat. Due to its surface tension, the glass material that has been rendered viscous thereby particularly flows into those regions where there is a deficit of material at the outside circumference at the contacting location KS. As a result thereof, the skip-like, particularly discontinuous shoulder between the outside contours of the two test fiber ends FE1, FE2 tacked to one another at their end faces is leveled in the plane of observation of FIG. 4. The glass flow is illustrated with arrows MF in FIG. 4. The thermal post-processing, i.e. finishing of the "offset splice" thus leads to a smoothing of the outside contours of the fiber ends FE1, FE2 in the region of their contacting location KS and, thus, to a reduction of the initial offset AV (see FIG. 5) to a remaining, residual offset RV. This residual offset RV can then be detected, for example with the assistance of the image processing means VK of FIG. 2, and can be utilized for identifying optimum welding or, respectively, splicing parameters.

Figure 5:
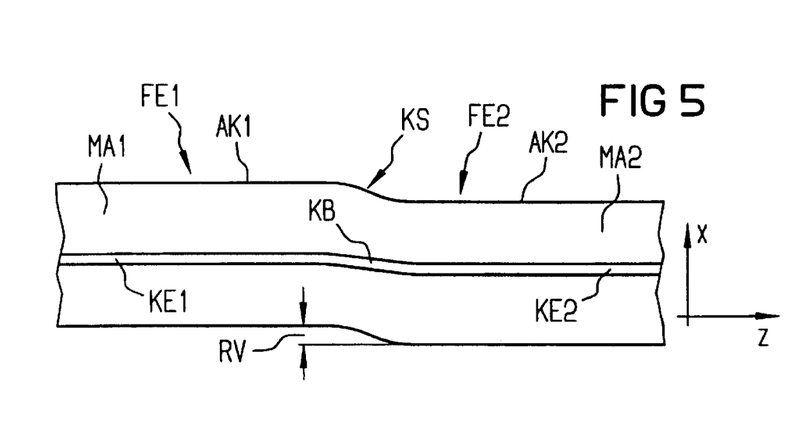
FIG. 5 is a magnified schematic view of the two test fibers of FIG. 4 after their thermal welding, whereby a radial residual offset remains between their outside contours.

In a schematic as well as magnified view in the x, z-plane of observation, FIG. 5 illustrates the resultant smoothing of the outside contours of the two test optical fibers FE1, FE2 in the region of their contacting location KS after the two test fibers have been fused with one another.

A type of self-centering of the two test fiber ends FE1, FE2 toward one another is effected by the glass flow MF, so that only a radial residual offset RV remains between their outside contours, this being smaller than the prescribed, radial initial offset AV. What this means in other words is that, due to the surface tension of the glass material (cladding glass and/or core glass) that was rendered viscous, a deformation or, respectively, bending of the test optical fiber ends FE1, FE2 is effected to the effect that these automatically align in alignment with one another in a first approximation except for the remaining, radial residual offset RV. Due to this self-centering effect, the fiber cores KE1, KE2 originally laterally offset relative to one another by the initial offset can be moved toward one another or, respectively, deformed in the cladding glass that was rendered viscous so that these cores are fused with one another at their end faces. Whereas, thus, the fiber cores KE1, KE2 exhibit a prescribable radial offset relative to one another (as shown in FIG. 4) before implementation of the smoothing of the outside contours of the test optical fiber ends FE1, FE2, they are continuously joined to one another (as shown in FIG. 5) across the contacting location KS after implementation of the smoothing. In the actual fusing or, respectively, welding of the test fiber ends FE1, FE2, thus, these are deformed such that their outside contours as well as their fiber cores KE1, KE2 extend approximately along a common, imaginary alignment line, whereby the residual offset RV remains. The self-centering effect is also expressed, for example, in a decrease of the attenuation of test light such as, for example, ML (see FIG. 2) that can be potentially conducted across the connecting or, respectively, contacting location KS.

The strength of the self-centering effect of the glass material rendered viscous can thus be advantageously employed as measured quantity for the fiber heating. The offset-reducing effect caused by the respective welding process itself can thus be evaluated and conclusions about the heat quantity in fact acting on the fiber ends can be derived. The degree of the reduction of the initial offset AV prescribable in defined fashion—preferably expressed by the remaining residual offset RV—can then be advantageous utilized as criterion for the glass viscosity that derives under the respective currently prevailing welding conditions (such as, for example, air humidity, air pressure, air temperature, fiber type, electrode condition, etc.) as well as under the given welding parameters (such as, for example, welding current intensity, welding duration, etc.). is The glass viscosity that occurs is thereby a criterion for the thermal heat that in fact takes effect at the test fibers given the welding parameters that have been set. In particular, the glass viscosity that is required for an optimum welding of two optical fibers corresponds to a specific reduction of the prescribable initial offset AV, i.e. to a defined difference between the initial offset AV and the residual offset RV. Expressed in general terms, conclusion for the selection of an optimum set of welding parameters for producing a thermal weld between two optical fibers can thus be indirectly drawn from the degree of reduction of the predetermined initial offset of an "offset splice".

The offset-reducing effect of the respective welding event at the test fibers is expediently acquired in that an optical image for the respective test fiber FE1 or, respectively, FE2 is produced as well as registered in at least one projection plane—in the x, z-plane of observation here. To that end, the optical imaging and pick-up system VK that offers the image information of the fiber images to the evaluation/control means COM for evaluation is provided in the welding apparatus PV of FIG. 2. At least one criterion for the offset reduction effected by the respective welding event can then be determined from the image information of the two test fibers.

In particular, the residual offset RV that remains between the outside contours AK1, AK2 of the two test fibers FE1, FE2 after the respective welding event can be determined as a criterion for the offset reduction. Further, the difference (AV-RV) between the initial offset AV and the residual offset RV that remains between the outside contours AK1, AK2 of the two test fibers FE1, FE2 after the respective welding event can be determined as warranted as a criterion for the offset reduction.

In particular, the following time sequence of method steps is expedient in the implementation of the respective pre-trial for the optimization of the set of welding parameters:

a) fiber preparation and positioning of two test fibers in the same way as for a normal, traditional weld.

b) Setting of a defined, lateral initial offset between the outside contours of the two test fibers in at least one positional plane.

This initial offset is expediently selected on the order of magnitude at most approximately equal to half the outside diameter of the test optical fibers respectively employed. Given a typical outside fiber diameter of about 125 $\mu$m, thus, the initial offset preferably lie on the order of magnitude of up to about 62.5 $\mu$m.

c) Fusion welding comprising the following individual steps:
The two intentionally mispositioned test optical fibers are first pre-welded. To that end, the two test fiber ends are first distanced from one another by a prescribable longitudinal spacing. The test fibers are then preferably only superficially melted at their end faces, i.e. are brought to softening temperature only thereat. Thereby or thereafter, the pre-heated, incipiently melted end faces of the test optical fibers are moved to one another, i.e. toward one another while being fed until they contact at their end faces. The test fibers, which are intentionally mispositioned with respect to their outside contours, thus form an "offset" splice connection. As warranted, the two pre-heated, i.e. pre-softened test fibers can even be moved into one another with excess length. Finally, the intentionally mispositioned test fiber ends that contact one another are fused (=main welding) with one another to form the actual, tensile splice connection, i.e. the "offset" splice is completed, as a result whereof an offset-reducing effect commences.

d) Determining the remaining, lateral residual offset between the test fibers welded to one another, i.e. of the completely welded "offset" splice, in at least one plane of observation, as well as evaluation of the lateral offset reduction for acquiring, particularly calculating, optimized welding parameters. To that end, the evaluation/control means such as, for example, COM of the splicing apparatus of FIG. 2 preferably evaluates the time curve of the discharge current intensity IS and advantageously places this into relationship with the respectively effected diminution or, respectively, reduction of the predetermined initial offset AV.

In particular, the following procedures can be expedient for the automatic determination of an optimum set of welding parameters:

1) For producing an offset test splice, the welding parameters are initially rigidly prescribed or permanently set by the user. Fundamentally, thus, any welding parameter values sufficient for melting the glass material can be initially set. In particular, standard values that are usually adequate for a melting of the glass material of the test fibers are prescribed for this first set of welding parameters (such as, for example, welding current, welding time, etc.). An "offset splice" is then produced according to the above-described comments with this first set of welding parameters, i.e. two test optical fibers to be connected to one another are mispositioned in a defined way in at least one positional plane with a prescribable, lateral initial offset AV, these mispositioned fiber ends are contacted with one another at their face ends and are potentially meltglued thereat. Only then are the two test fibers actually welded to one another (=main welding), i.e. brought to softening temperature at their contacting location, namely with the assistance of the set of welding parameters initially prescribed, so that their glass materials fuse with one another. (The "offset" splice is thus completed, particularly completed heated through and thereby entirely melted radially inward.) Conclusions about the effect of the heat source under the momentarily existing welding conditions, i.e. on the heat energy that in fact takes effect at the test fibers due to the first defined set of welding parameters, can be advantageously drawn from the residual offset RV that thereby ultimately occurs. Dependent on this identified residual offset, the required correction of the welding parameter set, i.e. of at least one of the welding parameters, can then be read from at least one previously defined characteristic for the optimization thereof or can be automatically implemented with the assistance of the evaluation/control means COM of FIG. 2.

FIG. 1 schematically shows a possible field of characteristics for the correction and optimization of, for example, the welding current. The respectively remaining, lateral residual offset RV that derives after finishing the respective "offset" test splice is thereby entered along the abscissa of the characteristics field; a welding current correction value ΔI is allocated to the ordinate of the characteristics field. This characteristics field can be determined either computationally on the basis of theoretical considerations or empirically on the basis of prior trials.

In order to register a characteristics field for, for example, correction of the welding current in practice, the same welding duration is expediently employed insofar as possible for each of the test welds to be implemented, i.e. the same welding duration is subsequently constantly retained for the plurality of test welds to be implemented. The following procedure can be expedient for determining a correction characteristic for the welding current.

Given first, predetermined welding conditions, particularly given a first air pressure value, two test fibers are first aligned in optimum alignment with one another with respect to their outside contours, are brought together at their end faces and are then welded to one another given a specific, first welding current value (="normal test splice"). Such test splices are repeated upon variation of the welding current given these first, constantly maintained welding conditions until an optimum value of the welding current at which the finished splice connection exhibits a minimum transmission attenuation has been found. This empirically found, optimum welding current value is retained. Two test fibers are then welded to one another again given the first, constantly maintained welding conditions. However, the two test fibers are now arranged with a prescribable, lateral initial offset relative to one another and are then welded to one another (="offset splice") with the optimum welding current value identified for the first welding conditions. After this, the remaining, optimum residual offset between the outside contours of the test fibers is identified and recorded. The optimum residual offset is referenced ORV in FIG. 1.

Subsequently, the welding conditions are changed, and the remaining, lateral residual offset for a further "offset splice" of two test fibers is determined for these second welding conditions, particularly a second air pressure value. When a modified, non-optimum residual offset derives, then a "normal splice" (as described above) is repeated by variation of the welding current until a weld with minimal transmission attenuation is ultimately produced. This newly determined welding current value, which differs from the optimum welding current value by a correction value ΔI, is then allocated to this residual offset. A current correction characteristic such as, for example, IS1 of FIG. 1 can be ultimately acquired by, function approximation by corresponding repetition of this measuring procedure given different welding conditions.

In simplified fashion, the correction characteristic IS1 in FIG. 1 is approximated to a straight line with positive slope. It proceeds mirror-symmetrically with respect to the optimum residual offset ORV.

A family of characteristics for the correction of the welding current can potentially derive given different, respectively invariably set welding durations. Three further correction characteristics IS2 through IS4 that are allocated to the different welding durations are therefore entered in FIG. 1. A straight line with a positive slope is respectively assumed for them in a first approximation. The various correction characteristics IS1 through IS4 exhibit different slopes and all intersect in the common intersection at the optimum residual offset ORV>0, ΔI=0.

This characteristics field is preferably durably stored in the evaluation/control means COM of FIG. 2. Of course, it is also possible to correspondingly determine correction characteristics for the other welding parameters.

In practical field use, an adaptation of the welding current to the currently existing welding conditions can then be undertaken in at least one pre-trial with the assistance of the respectively registered and durably existing current correction characteristic such as, for example, IS1 in order to be able to subsequently produce optimum welds. To that end, an "offset splice" of two test fibers is implemented at any, as yet unadapted welding current value and the remaining lateral residual offset is determined. When the measured residual offset such as, for example, RV1 is greater than the optimum residual offset ORV, then the welding temperature that was effected is too low. This, for example, can occur when welding at high altitude, where the air pressure is lower. A current boost by KI1 is therefore allocated to the residual offset RV1 on the basis of the correction characteristic IS1 of FIG. 1 in order to set an optimum welding current for the newly existing welding conditions. The optical fiber splices to be actually produced are fabricated only thereafter. When, conversely, the measured residual offset such as, for example, RV2 is smaller than the optimum residual offset ORV, then the welding temperature that was effected is too high. A current reduction by K12 is therefore allocated to the residual offset RV2 on the basis of the correction characteristic IS1 of FIG. 1 in order to set an optimum welding current for the newly existing welding conditions.

In that a specific set of welding parameters (particularly characterized by the discharge current intensity, welding duration, etc.) is fixed and what residual offset occurs for the predetermined initial offset is measured under the existing, external general conditions (such as, for example, air humidity, air pressure, air temperature, fiber type, electrode spacing, etc.), a very simple, direct and exact review of these welding parameters is enabled. This procedure is particularly suitable when only slight parameter corrections are required or when only a review of the set parameters or, respectively, of the proper operation of the apparatus is to be undertaken.

2) It can be especially expedient—proceeding from a predetermined initial offset AV—to heat the two optical fibers with a variation of one or more of the welding parameters under the existing welding conditions and to fuse them to one another so that a fixed residual offset, i.e. a defined rated offset, is achieved. This rated offset is expediently determined in pre-trials so that it corresponds to the smoothing behavior given optimum welding parameters. The rated offset is preferably typically selected approximately equal to half the initial offset. By variation of the welding parameters, particularly during the main welding, i.e. during the actual fusing of the two intentionally mispositioned fiber ends, an attempt is thus made to reduce the predetermined initial offset to a specific, defined residual offset given the respectively existing boundary conditions (such as, for example, air humidity, air pressure, air temperature, fiber type, electrode spacing, preferably degree of electrode contamination, etc.). Expressed in other words, this means that the individual welding parameters (such as, for example, discharge current intensity, welding time, glow discharge pulse duration, etc.) are adapted to the respectively existing welding conditions (such as, for example, air humidity, air pressure, air temperature, fiber type, electrode spacing, etc.) in an iterative way so that, proceeding from a specific, predetermined radial initial offset between the outside contours of the two optical fibers to be respectively connected to one another, a specific, desired residual offset that is characteristic for an optimum welding of the optical fibers remains after implementation of the smoothing. As a result of this iterative method, the production of a single offset splice already advantageously suffices for determining an optimum set of welding parameters. Differing from the procedure under 1), the production of a plurality of offset splices is no longer required in the iterative procedure for greater corrections of welding parameters. Moreover, the characteristics field according to the first procedure under 1) is thereby not required, since the residual offset (=rated offset) achieved during the offset splice already corresponds to optimum welding parameters given the iterative procedure. Compared thereto, it can potentially occur in the first procedure under 1) given extreme deviation of the fixed welding parameters from the desired, optimum welding parameters that either no reduction at all of the initial offset occurs (since the welding energy is too low) or that the residual offset is too slight for a meaningful evaluation. In these cases, a repetition of the offset splice with appropriately modified welding parameters is expedient.

Figure 6:
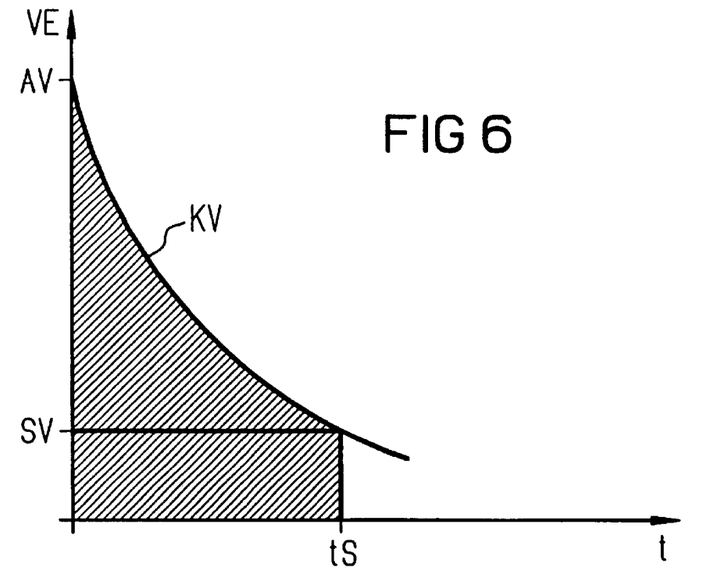

It can be particularly expedient for determining the optimum welding parameters to acquire the modification of the predetermined initial offset AV during the smoothing event in real time and offer it for evaluation. To that end, for example, it can be expedient to generate a continuous glow discharge whose welding current intensity is essentially constant. On the basis of a schematic offset time diagram VE/t, FIG. 6 illustrates how the radial offset VE between the outside contours of the test fibers thereby varies continuously during the welding time t. The welding time t after which a rated offset SV derives as residual offset, i.e. RV=SV is achieved, is continuously observed. This is then the optimum welding time tS for the intensity of the discharge current that has been set. In particular, the real-time evaluation has the advantage that the execution of the welding process hardly differs from the production of a normal weld. The optimum welding time tS can be directly determined, i.e. without conversions, for example with the assistance of the image processing system VK of FIG. 2.

Figure 7:
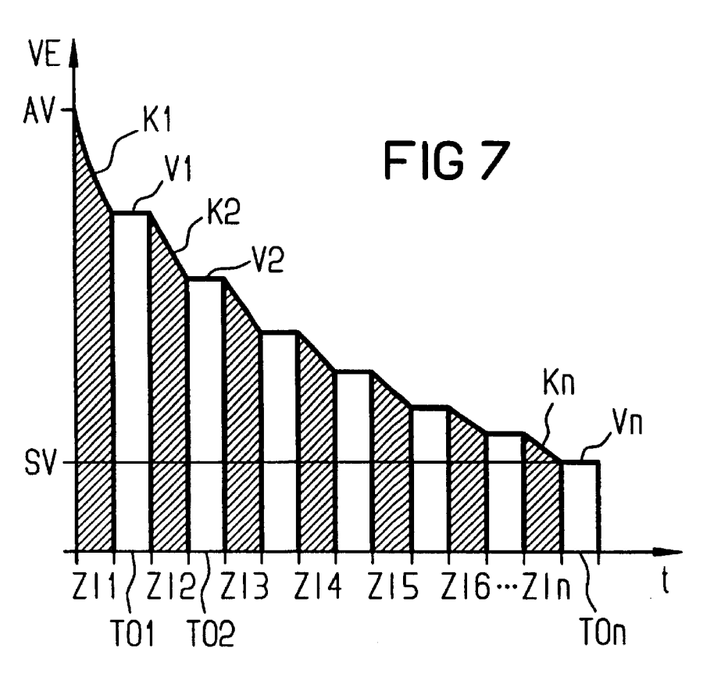
FIG. 7 illustrating offset versus time with the welding being a series of welding pulses.

It can be especially expedient to output a chronological succession of glow discharge pulses that are separated from one another by time pauses, i.e. dead times, onto the contacting region of the two optical fibers that are arranged with a prescribable, radial initial offset relative to one another. What can thereby be achieved is that the overall welding procedure is divided into a plurality of time intervals with respectively following evaluation. FIG. 7 illustrates this by way of example with reference to a schematic offset/time diagram VE/t. The time intervals during which a glow discharge respectively occurs between the two electrodes EL1, EL2 of FIG. 2 and, thus, a discharge current IS flows are referenced ZI1 through ZIn and shaded in FIG. 7. A change, particularly a decrease, of the radial offset VE between the two fiber ends respectively derives during these time intervals. The radial offset VE thus diminishes per welding interval ZI1 through ZIn. A prescribable dead time during which the radial offset VE does not change further but remains essentially constant is respectively adhered to between respectively two successive glow discharge pulses. The residual offset during these dead times is referenced V1 through Vn in FIG. 7. The reduction of the radial offset VE during the welding intervals ZI1 through ZIn is identified with appertaining reference characters K1 through Kn in FIG. 7. This interval welding makes it possible to divide the welding process into a plurality of intervals with respectively following evaluation. An adequate time interval during which the residual offset VE respectively deriving after output of a glow discharge pulse can be acquired and offered for evaluation is thus respectively available during the dead times TO1 through TOn. The optimum welding time is then preferably calculated from the sum of the individual time intervals ZI1 through ZIn during which a respective discharge current IS flows between the two electrodes EL1, EL2 of FIG. 2. It is thereby expedient to also subtract the times for the warm-up phases of the test splice from this sum. Since the influence of the warm-up phases is difficult to calculate in practice, it is expedient to keep this influence as slight as possible. To that end, the welding intervals ZI1 through ZIn are selected optimally short. An expedient interval duration preferably lies on the order of magnitude of about 0.5 sec. Compared to the real-time evaluation, thus, more time is available for the evaluation of the respectively deriving residual offset. The evaluation, particularly, for example, with the image processing system VK of FIG. 2, is simplified because it can be undertaken given a cold splice location. Problems of a type that can occur given evaluation of image information of a hot splice are thereby avoided. The working speed of the evaluation system, particularly the evaluation/control means COM of FIG. 1, can be kept lower than in the real-time evaluation according to 1) due to the division into welding and dead time intervals. In interval welding, thus, the precision is limited merely by the minimum interval duration during which the respective residual offset is acquired and offered for evaluation.

Figure 8:
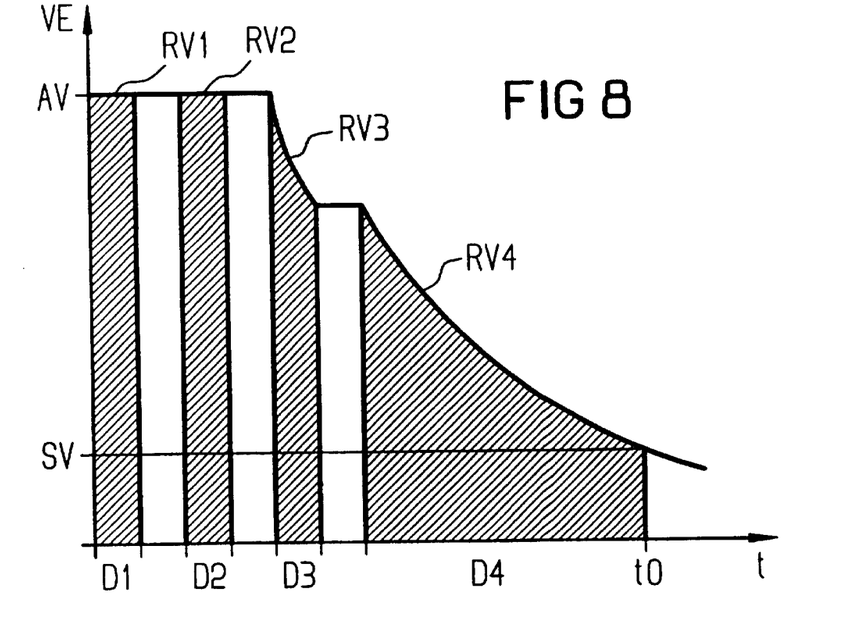
FIG. 8 illustrating offset versus time for welding current pulses.
Figure 9:
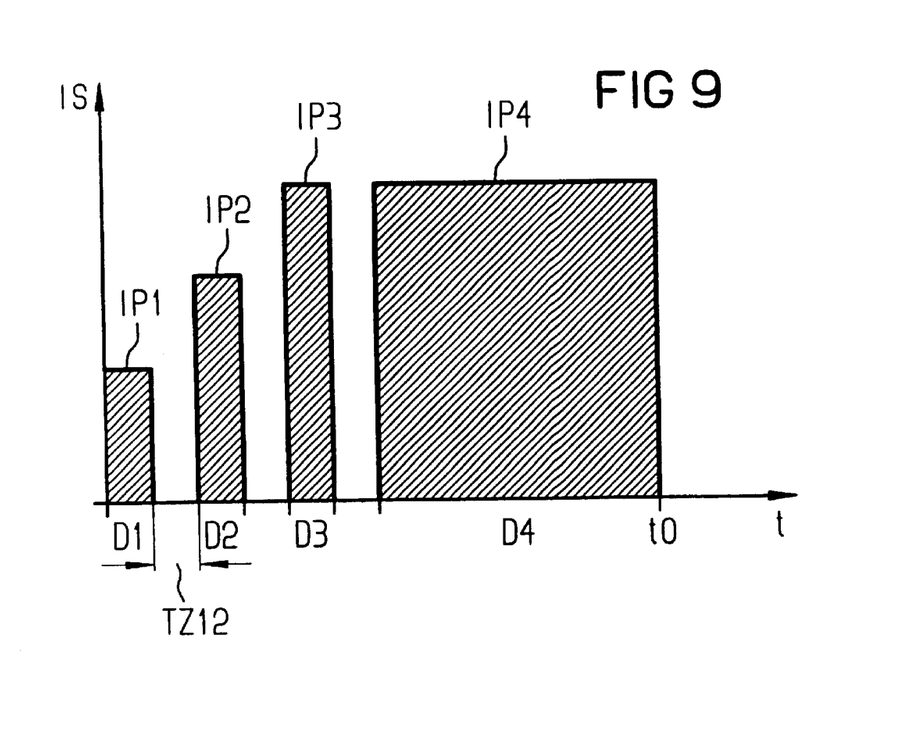
FIG. 9 is the discharge current/time diagram belonging to FIG. 8.
Figure 10:
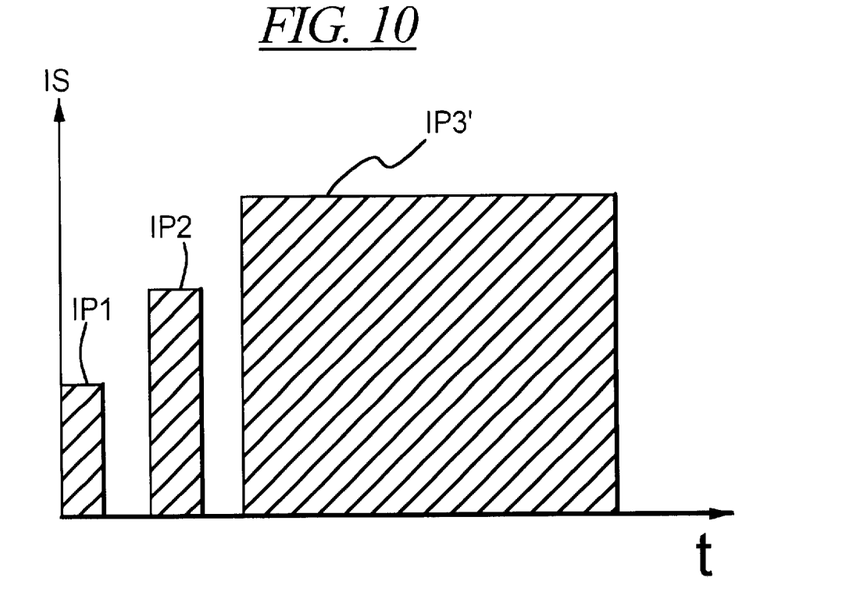
FIG. 10 is a variation of the pulses of FIG. 9.

It can be especially expedient to heat the end faces of the optical fiber ends contacted with a prescribable, radial initial offset only to such an extent that a change of the initial offset first becomes visible at all and, thus, is measurable. With reference to a discharge current intensity/time diagram IS/t, FIG. 9 schematically shows how, on the basis of an appropriate selection of the time curve of the discharge current intensity IS, the contacting location KS of the two optical fibers can be pre-heated until a first change of the predetermined initial offset AV first occurs at all. A step-by-step heating of the region around the contacting location KS of the two optical fibers can be particularly achieved with the assistance of a chronological sequence of individual glow discharge pulses. A plurality—four here by way of example—of welding current pulses IP1 through IP4 for four glow discharges are entered in FIG. 9. They are respectively schematically indicated in the form of a narrow rectangle. The welding current intensity IS of the first three welding current pulses IP1 through IP3 increases successively viewed over the time t, i.e. a step-by-step increase of the welding current intensity IS occurs from one welding current pulse to the chronologically next welding current pulse. The welding current pulses IP1 through IP4 preferably each respectively exhibit a prescribable pulse length D1, D2, D3 as well as D4. The time spacing, i.e. the dead time or, respectively, pulse pause such as, for example, TZ12, between respectively two chronologically successive, neighboring welding current pulses such as, for example, IP1, IP2 can likewise be individually set. In that the welding current intensity IS is successively boosted from one glow discharge pulse to the chronologically next glow discharge pulse, it is possible to heat the contacting region KS of the optical fibers FE1, FE2 more and more highly in a precisely dosed way until the beginning of a reduction of the initial offset AV can be identified at all for the first time. The discharge current intensity is so slight during the time intervals D1, D2 that no offset reduction occurs at all. The discharge current intensity first suffices for an offset reduction during the time interval D3. This is recognized, and work is then continued, for example, particularly with the assistance of the real-time evaluation described above with reference to FIG. 6. Dependent on the time t, FIG. 8 shows the respectively deriving radial offset VE corresponding to the discharge current intensity/time diagram IS/t of FIG. 9. A diminution or, respectively, reduction of the initial offset AV does not yet occur during the welding intervals D1, D2, i.e. the predetermined initial offset AV=RV1=RV2 remains initially unchanged, i.e. constant. The heat quantity of the third discharge current pulse IP3 first suffices in order to initiate a reduction of the predetermined initial offset AV. Beginning with the time from which a reducing effect of the initial offset initially starts, the contacting location KS then continues to be continuously heated until the defined, prescribable residual offset SV is reached at time t0. To that end, it can be expedient, according to FIG. 8, to work with a continuous glow discharge whose discharge current intensity IP4 essentially corresponds to the discharge current intensity of the discharge current pulse beginning with which the reducing effect of the radial offset starts, IP3 here. The same discharge current intensity as during the time interval D3 is thus preferably used during the time interval D4 for the real-time evaluation or a constant current pulse IP3' (FIG. 10) can replace the pulse IP3 and IP4. The constant curve of the fourth glow discharge IP4 (see FIG. 9) ends at time t0 at which the desired residual offset SV of FIG. 8 is reached. The radial offset RV4 between the outside contours of the two optical fibers decreases continuously during the welding duration D4 of the last—here, fourth—glow discharge pulse IP4 (see FIG. 9).

The optimum welding time for the optimized set of welding parameters that is sought then preferably derives as sum of the time interval durations D3 and D4, i.e., viewed generally, only from the time intervals in which a reduction of the initial lateral offset AV is effected. The effect of the time intervals D1 and D2 can be neglected since no offset-reducing effect occurred there. An exact optimization of the splicing parameters is advantageously possible in this way without the optimum welding current having to be approximately known at all.

FIGS. 8, 9 thus illustrate a combination of interval welding with variation of current and real-time evaluation given continuous welding.

Viewed in summary, thus, it is especially expedient to increase the intensity of the welding current continuously (see FIG. 11) or in steps (discrete) or, respectively, in stages (FIG. 9 or 10), so that one can start with a relatively low welding current. The discharge current is first successively increased in the following time intervals until an offset-reducing effects shows up given the correct discharge current. Beginning with the point in time from which the intensity of the discharge current suffices for initiating the self-centering effect, the effect of the preceding time intervals during which a smoothing and, thus, an offset-reducing effect is not yet achieved can be left out of consideration. By appropriate variation of the intensity of the discharge current and/or of the pulse duration, one can thus creep up step-by-step to that heat quantity that suffices for initiating the self-centering effect. The remaining optimization can then be optionally undertaken in real time of by interval welding. This measuring principle has the advantage that it can be utilized effectively under a number of practical conditions. A fine adjustment, particularly of the intensity of the discharge current, is thereby avoided. If, namely, one were to work, for example, with a very high discharge current from the start, then there would only be an extremely short evaluation time available. Given an extremely low intensity of the discharge current, by contrast, it could occur that the melting temperature of the glass would not be reached at all. The successive increase of the intensity of the discharge current thus makes it possible to find a suitable intensity of the discharge current, beginning with which the self-centering effect first begins at all.

The following procedures, listed in summary, can thus likewise be respectively suitable, individually or in arbitrary combinations with one another:

The region around the contacting location is preferably heated so that a rigidly prescribed, radial rated residual offset between the two contacting test fibers is achieved. The rated residual offset should thereby de defined such that it is allocated to an optimum welding behavior of the optical fibers to be welded to one another.

The welding time after which the predetermined rated residual offset is achieved is thereby measured.

That time duration that is required, proceeding from the initial offset, to achieve a prescribable, radial rated residual offset between the test fibers can preferably be determined as criterion for the offset reduction of the two test fibers as a result of the respective welding operation.

The welding current that is required, proceeding from the initial offset, in order to achieve a prescribable, radial rated residual offset between the test fibers can preferably be defined as criterion for the offset reduction of the two test fibers as a result of the respective welding operation.

The region around the contacting location is thereby preferably heated so that the rated residual offset lies at about half the initial offset.

An optimization of at least one welding parameters is then preferably undertaken with the assistance of the respectively identified criterion.

The welding of the end faces of the two test fibers can be continuously implemented.

In addition thereto or independently thereof, the welding of the end faces of the two test fibers can also be potentially implemented in chronologically successive welding intervals with intervening dead times.

At least such a high welding current intensity that an offset-reducing effect is achieved can already be expediently employed at the beginning of the respective welding operation for the welding of the two test fibers.

In addition thereto or independently thereof, the welding current intensity for the welding of the two test fibers can also be raised until an offset-reducing effect of the contacting test fibers occurs for the first time. The welding current intensity is then expediently held constant beginning with the start of the offset-reducing effect.

Figure 11:
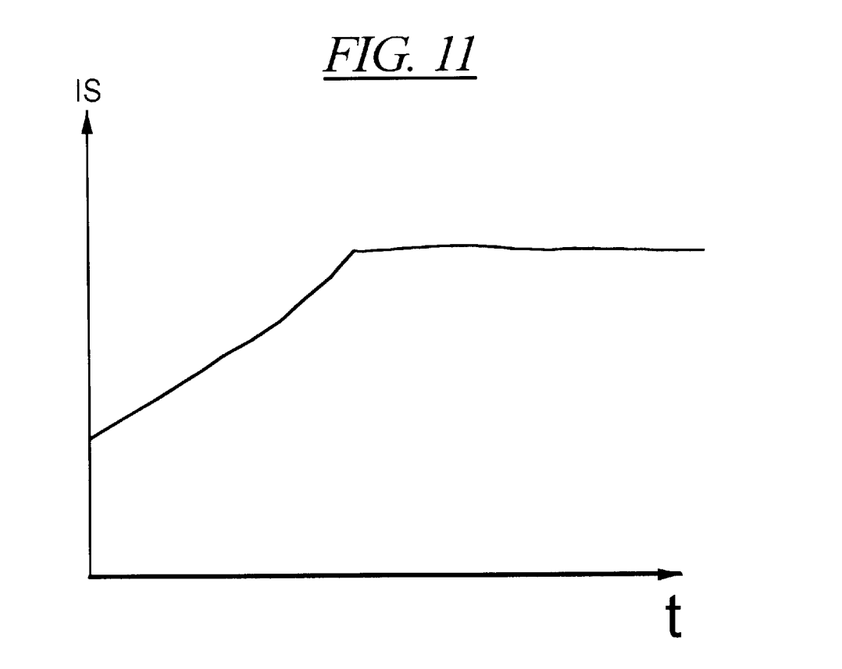
FIG. 11 is a discharge currentltime diagram with an increasing welding current intensity followed by a constant welding current intensity.

The welding current intensity can be increased until an offset-reducing effect of the contacting test fiber occurs and then the welding current intensity is held constant from the start of the offset-reducing effect as shown by the discharge current/time diagram of FIG. 11.

3) In addition to or independently thereof, it can also be potentially expedient to indirectly determined the offset reduction via the measurement of the light power level of test light such as, for example, ML in FIG. 2. What is referred to as the LID measuring method, as disclosed in U.S. Pat. 5,078,489 is particularly suitable therefor. The light power level of the test light conducted across the contacting location KS is thereby preferably already measured before the smoothing of the optical fibers. The light power level is then continuously measured during the smoothing phase or respectively after every splicing current pulse and, in particular, is continuously co-logged by the evaluationicontrol means COM of FIG. 2. As warranted, an abort criterion for the offset reduction of the fiber ends can be derived from the registered light power level. The time curve of the light power level can be co-incorporated in the determination of optimum welding parameters.

4) It can be particularly expedient to potentially implement a plurality of test splices and to average the parameter sets thereby acquired.

Viewed in generalizing fashion, the following procedure is thus expedient in practice for the welding of two respective optical fibers allocated to one another:

In at least one pre-trial, at least one test splice is produced for the respectively currently existing welding conditions in order to determine an optimum set of welding parameters.

For this test splice, two test fibers are arranged offset with a prescribable, lateral initial offset relative to one another with respect to their long sides. These test fibers arranged laterally offset relative to one another are then brought into contact at their end faces.

The contacting region of these two test fibers is subsequently heated so that the prescribed, lateral initial offset is reduced due to the surface tension of their melted glass material, whereby at least one criterion for this offset reduction is determined. The optimum set of welding parameters is determined on the basis of this criterion and is set in fixed fashion for the existing welding conditions. Only after this at least one pre-trial is the actual weld between two respective optical fibers produced with the optimum welding parameters determined therefrom.

In particular, this inventive method for determining optimum splicing parameters is especially distinguished in that the relationship of fiber viscosity to the welding current employed as well as the appertaining welding time can be measured at relatively low temperatures. As a result thereof, an overheating of the optical fibers and the disadvantages connected therewith, such as, for example, evaporation of the glass material of the respective optical fibers and an electrode contamination resulting therefrom, can be largely avoided. Further, the inventive method can already be realized solely with the components already present in standard splicing apparatus, i.e. additional hardware. is usually not required. Further, the inventive measuring method advantageously makes it possible to respectively automatically determined the sets of welding parameters. As a result thereof, time-consuming and extensive series of trials for developing optimum splicing parameters can be avoided. A further, particular advantage of the inventive method is particularly comprised therein that the determination of the welding parameters is implemented essentially at the same test subject as well as under the same welding conditions as the later, actual weld between two respective light waveguides to be connected to one another. The particular advantage is thus particularly comprised therein that the conditions of the production of a normal weld can be simulated largely true to reality. In the determination of the welding parameters, thus, it is essentially the same mechanisms as are present in the production of the actual weld and that determined the splice attenuation in a normal splice that are effective and can be interpreted.

Viewed in summary, thus, the various variations of the inventive test welding (respectively by themselves or combinations thereof), advantageously make it possible to determined an individually adapted set of welding parameters for different welding conditions (such as, for example, air humidity, air pressure, fiber type, electrode spacing, etc.), so that an optimum glass viscosity can be achieved during the welding process. Expressed simplified, such a set of welding parameters adapted to the respectively existing welding situation can ensue indirectly via the measurement of the reduction or, respectively, diminution of a predetermined, initial offset between the two optical fibers to be welded to one another dependent on the intensity of the splicing current, welding time, etc., employed. The extent of the self-centering effect of the viscously rendered glass material of the optical fibers is thereby employed as measured quantity for the fiber heating. In the ideal case, the optimization of the splicing parameters can already thereby even be implemented on the basis of a single test splice. Since the determination of the splicing parameters is implemented with the assistance of at least one test splice that largely corresponds to the actual, later splice connection, it is precisely those effects that could lead to a potential falsification of the measured result or to a deterioration of the condition of the splicing apparatus that are largely avoided. Possible quantities that determine a quality of the weld can thus be comprehensively co-involved. Justice can thus be done to changing or, respectively, different welding conditions, i.e. the setting of welding parameters can thus be undertaken in a simple way so that an optimally good weld between two respective optical fibers is produced that is largely independent of environmental and/or ambient influences. In this way, the splice quality of thermal welds between at least two optical fibers can be quite substantially improved.

The inventive method can also be potentially transferred to the welding of two groups of a plurality of light waveguides.

What is claimed is:

1. Method for modifying welding parameters for the production of a thermal weld between two respective optical fibers, which are to be connected to one another, said method comprising the steps of:

producing in at least one preliminary trial at least one test splice under the respectively present, prevailing welding conditions, said test splice being formed by positioning at least two optical test fibers relative to one another with a predetermined radial initial offset, contacting the end faces of these test fibers with said radial offset, heating the region around the contacting location of said two test fibers in at least one welding process in such a way that an offset-reducing effect between the two test fibers occurs, said heating including increasing a welding current intensity for the welding of the two test fibers until an offset-reducing effect of the contacting test fibers first occurs and then holding the welding current intensity constant from the start of the offset-reducing effect, and adapting at least one of the welding parameters for the present, prevailing welding conditions, which are selected from present, prevailing, apparatus conditions with the help of this offset-reduction caused by the heating during the preliminary trial and setting this adapted welding parameter for a later welding between the two optical fibers which are to be connected to one another, and only after said preliminary trial making the weld between the actual two optical fibers desired to be connected to one another using said individually set welding parameters adapted to the present, prevailing welding conditions in the preliminary trial before.

2. Method for modifying welding parameters for the production of a thermal weld between two respective optical fibers, which are to be connected to one another said method comprising the steps of:

producing in at least one preliminary trial at least one test splice under the respectively present, prevailing welding conditions, said test splice being formed by positioning at least two optical test fibers relative to one another with a predetermined radial initial offset, contacting the end faces of these test fibers with said radial offset, heating the region around the contacting location of said two test fibers in at least one welding process in such a wave that an offset-reducing effect between the two test fibers occurs, determining a difference between the initial offset and a residual offset that remains between the outside contours of the two test fibers after the respective welding process as a criterion for the offset reduction, and adapting at least one of the welding parameters for the present, prevailing welding conditions, which are selected from present, prevailing environmental conditions and present, prevailing apparatus conditions with the help of this offset-reduction caused by the heating during the preliminary trial and setting this adapted welding parameter for a later welding between the two optical fibers which are to be connected to one another, and only after said preliminary trial making the weld between the actual two optical fibers desired to be connected to one another using said individually set welding parameters adapted to the present, prevailing welding conditions in the preliminary trial before.

* * * * *